United States Patent [19]

Guan

[11] Patent Number: 5,440,347
[45] Date of Patent: Aug. 8, 1995

[54] METHOD AND APPARATUS FOR RANDOMIZING TRAINING SEQUENCES TO MINIMIZE INTERFERENCE IN DIGITAL TRANSMISSIONS

[75] Inventor: Zhi-Yuan Guan, Croton-on-Hudson, N.Y.

[73] Assignee: Philips Electronics North America Corporation, New York, N.Y.

[21] Appl. No.: 136,425

[22] Filed: Oct. 13, 1993

Related U.S. Application Data

[63] Continuation-in-part of Ser. No. 60,181, May 7, 1993.

[51] Int. Cl.6 ............................................. H04N 7/00
[52] U.S. Cl. ................................... 348/466; 348/473; 348/474
[58] Field of Search ............... 348/429, 466, 467, 470, 348/473, 474, 475, 461

[56] References Cited

U.S. PATENT DOCUMENTS

4,913,549  3/1990  Altman et al. ....................... 348/496
5,134,464  7/1992  Basile et al. .......................... 348/487

Primary Examiner—Victor R. Kostak
Assistant Examiner—Nathan J. Flynn
Attorney, Agent, or Firm—Michael E. Marion

[57] ABSTRACT

A method and apparatus for transmitting a digital television signal which provides audio, video and data packets alternating with training signals. In order to minimize interference to other systems which could occur due to the periodicity of the training signal, randomly selected training signals are inverted prior to combining them with the data packets.

5 Claims, 4 Drawing Sheets

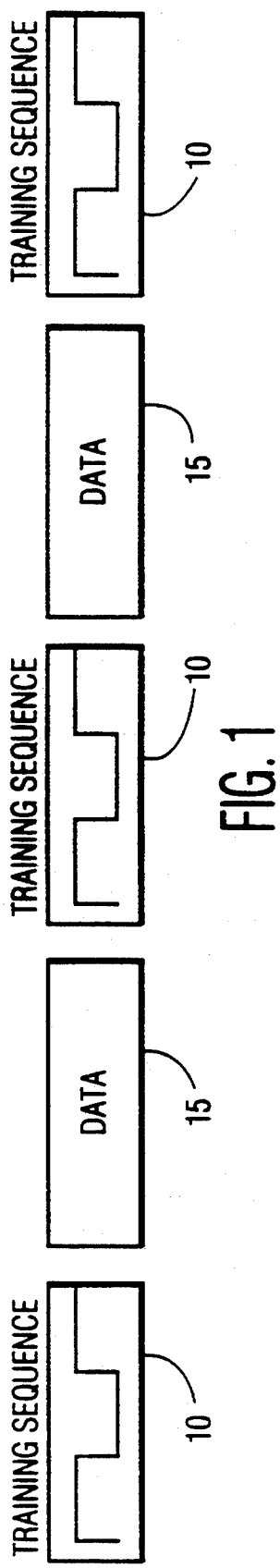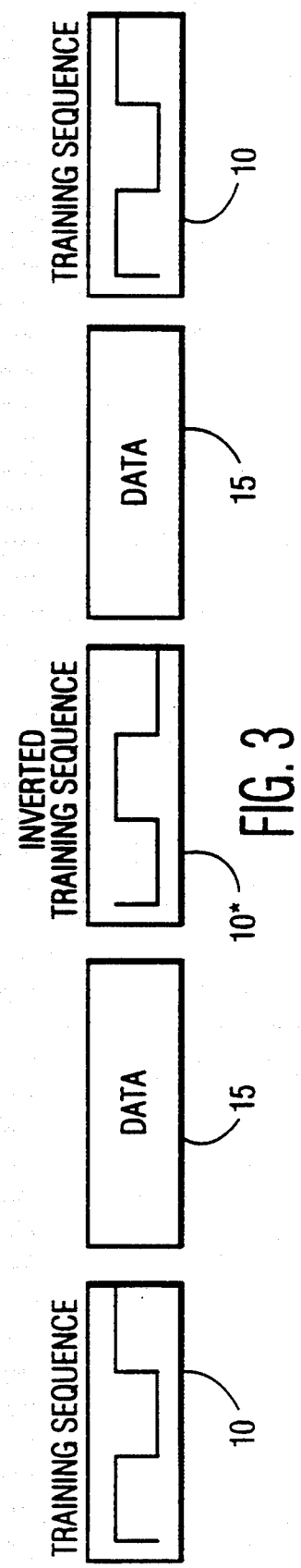

METHOD AND APPARATUS FOR RANDOMIZING TRAINING SEQUENCES TO MINIMIZE INTERFERENCE IN DIGITAL TRANSMISSIONS

BACKGROUND OF THE INVENTION

This application is a continuation in part of U.S. Ser. No. 08/060,181 filed on May 7, 1993 the contents of which is incorporated by reference herein.

Federal Communications Commission and cable television testing organizations such as Cable Labs, have been evaluating digital television delivery systems in order to choose a new television "standard" which someday will replace NTSC in the United States. These systems all involve digital coding and data compression techniques, for example those utilizing the MPEG algorithm or variations thereof. Such systems utilize other digital compression schemes, for example MUSICAM, to digitally code audio. MPEG is discussed in U.S. Ser. No. 774,006, filed Oct. 8, 1991 which is incorporated by reference herein.

The parent application described a method and apparatus for providing a single carrier QAM television signal which emulates the reception characteristics exhibited by audio and video in conventional analog television systems by using multiresolution signal constellations or by time-division multiplexing different constellations to prioritize the transmission of portions of a television signal.

In digital data transmission systems information is coded into data bits and a modem transmitter encodes groups of bits into symbols for transmission at a prescribed signaling rate. The analog transmission channels usually introduce linear amplitude and phase distortion to the transmitted signal as well as multipath. This distortion can cause an overlap of received symbols known as intersymbol interference (ISI). Such distortion can be compensated for by using an adaptive digital equalizer in the modem receiver to eliminate ISI caused by channel impairments. These equalizers require rapid, accurate and dependable estimation of the characteristics of the transmission channel in order to provide for fast start-up equalization. As described in the parent application training sequences are embedded in the data stream to acheive the periodic equalization.

The parent application describes a data stream which comprises, in addition to a main header packet comprising a "long" training sequence, additional headers each comprising "short" training sequences.

The addition of a "short" training sequence is useful for example, to compensate for mismatch caused when multiple receivers are connected to a cable system tap through a splitter. For example, a digital set top converter which might be initially used to receive digital television broadcasts by converting them to NTSC would be coupled to an analog NTSC TV set by a splitter. The "return loss", or equivalently the amount of signal reflected by the tuner in the analog set varies tremendously and therefore the digital converter may see a significant variation in the channel characteristics due to coupling through the splitter. This variation may occur so quickly that it cannot be tracked by the steady state adaptation mechanism of the demodulator in the set top converter. The demodulator's equalizer will therefore have to be re-initialized for the new channel characteristics and this can only happen after the demodulator receives the next training sequence. However it is not necessary to use the "long" training sequence normally used to adapt during power up or channel flipping. We can assume that the demodulator timing and frequency synchronization is undisturbed, so that it is only necessary to send a "short" training sequence to account for disturbances by other devices attached through splitters to the same cable.

Where training sequences (for example the "long" and "short" sequences of the parent application) are periodically embedded in the data stream, repetitive patterns occur in the time domain and tone effects can result in the frequency domain. This can lead to RF and harmonic interference with other systems, for example NTSC television signal on "simulcast" co-channel. The object of the instant invention is to avoid or minimize such interference.

SUMMARY OF THE INVENTION

The instant invention comprises a method and apparatus for inverting on a random (or pseudorandom) basis, the logical state of the bits of successive training sequences in order to avoid periodicity and thereby minimize interference to other systems.

BRIEF DESCRIPTION OF THE DRAWINGS

FIG. 1 describes a data stream wherein data packets are interspersed periodically with training sequences;

FIG. 3 describes the data stream of FIG. 1 after processing the training signals in accordance with the invention;

DETAILED DESCRIPTION OF PREFERRED EMBODIMENTS OF THE INVENTION

Figure 2:
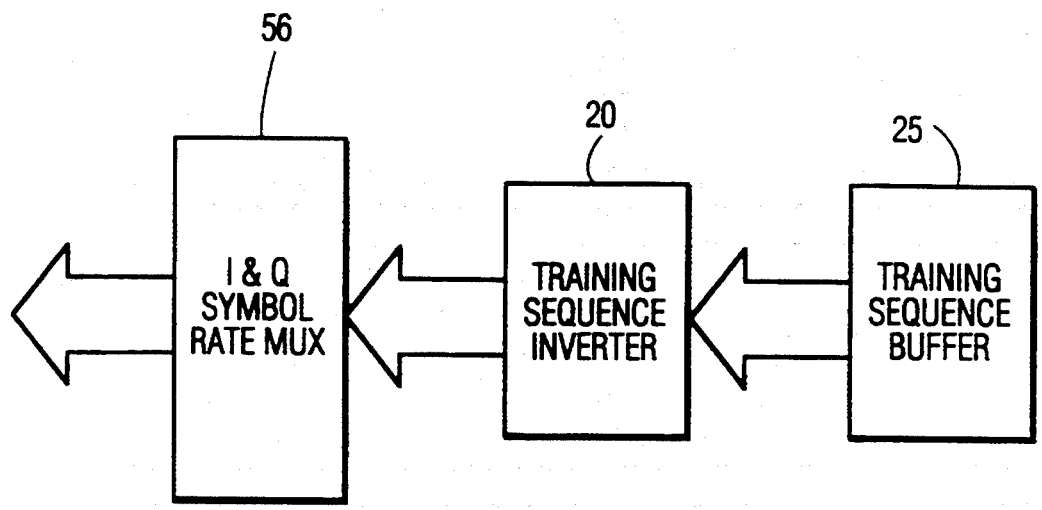
FIG. 2 is a block diagram of the invention.

FIG. 1 describes a data stream in the form of data packets 15 (e.g. audio and video information packets) periodically interspersed with training sequences 10. Since the parent application fully discusses the uses and implementation of training sequences in data streams, this information will not be discussed in great detail herein.

It is to be understood that each data packet 15 can comprise either audio or video information, or a combination of both, but is not limited to this type of data. As discussed in the parent application, is also to be noted that digital data carrying information with different degrees of priority (i.e. need for robustness) can be contained in respective data packets 15, each with a rate sequence defining its respective signal constellation appended thereto.

A sequence as defined herein denotes a sequence of bits which can represent one or more pieces of data and/or a digital code word.

The parent application describes preferred training signals which exhibit a constant amplitude and zero autocorrelation. These training signals are known in the art as CAZAC sequences.

As described in the parent application, periodic CAZAC training sequences in a one-way data transmission system can be used with alternation sequences for synchronization and packet detection. Although not shown in the figures, it is to be understood that a "training sequence" 10 can be either a training sequence alone, or a training sequence preceded by an alternation sequence.

The training sequence 10 is disposed within the data stream periodically to ensure that receivers can always receive a training sequence within a short time after being powered up, or upon switching channels. As shown, each training sequence 10 is identical in phase to the adjacent training signals. This periodicity in the placement of training signals can create RF interference which can disturb other systems, for example television programming on adjacent co-channel "taboo" channels. These channels will be used for providing conventional television when digital HDTV broadcasting, using such training signals, is implemented. Such periodicity can be minimized, or avoided altogether, however by changing the phase of alternating ones of said training signals 10 in accordance with the instant invention.

Figure 4:
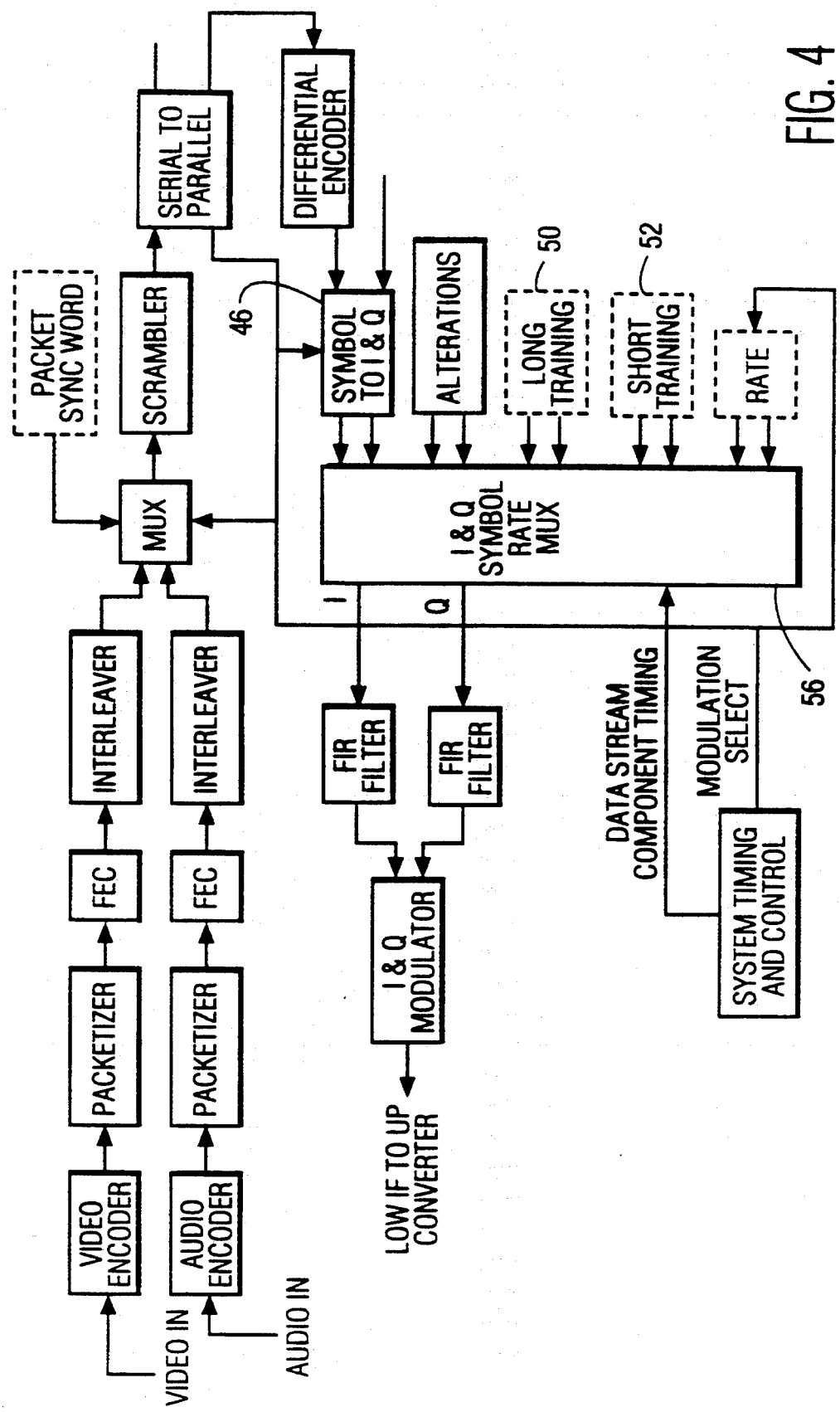
FIG. 4 is a block diagram of the transmitter of the parent invention which can be modified in accordance with the instant invention.

FIG. 2 shows a block diagram of a preferred embodiment of the invention which can be used in conjunction with the transmitter which is part of the parent invention and which is shown in FIG. 4.

I & Q symbol rate multiplexer 56, as is more fully described in the parent application, formats the data stream described in FIG. 1 by time multiplexing training sequences (for example training sequences provided by "short" training sequence generator 52), and data packets 15 (for example from symbol to I and Q converter 46), under the control of system timing and control means 64. The training sequence provided by training sequence buffer 25 is fed to training sequence inverter 20. As described in more detail below in conjunction with FIG. 5, training sequence inverter 20 acts to aperiodically (e.g. randomly) invert selected ones of said training sequences in order to avoid the periodicity which results in the undesired interference. The inversion of a sequence, in terms of complex representation, represents a 180 degree rotation which will not effect the operation of the training sequence in their use with known algorithms for equalizer training. The training sequence processed in accordance with the invention is then fed to I & Q symbol rate multiplexer 56.

FIG. 3 describes the data stream of FIG. 1 after it emerges from training sequence inverter 20. Three training sequences are shown and one of them, 10*, is shown inverted with respect to the training sequences 10, thus interupting the periodicity which otherwise would exist.

Figure 5:
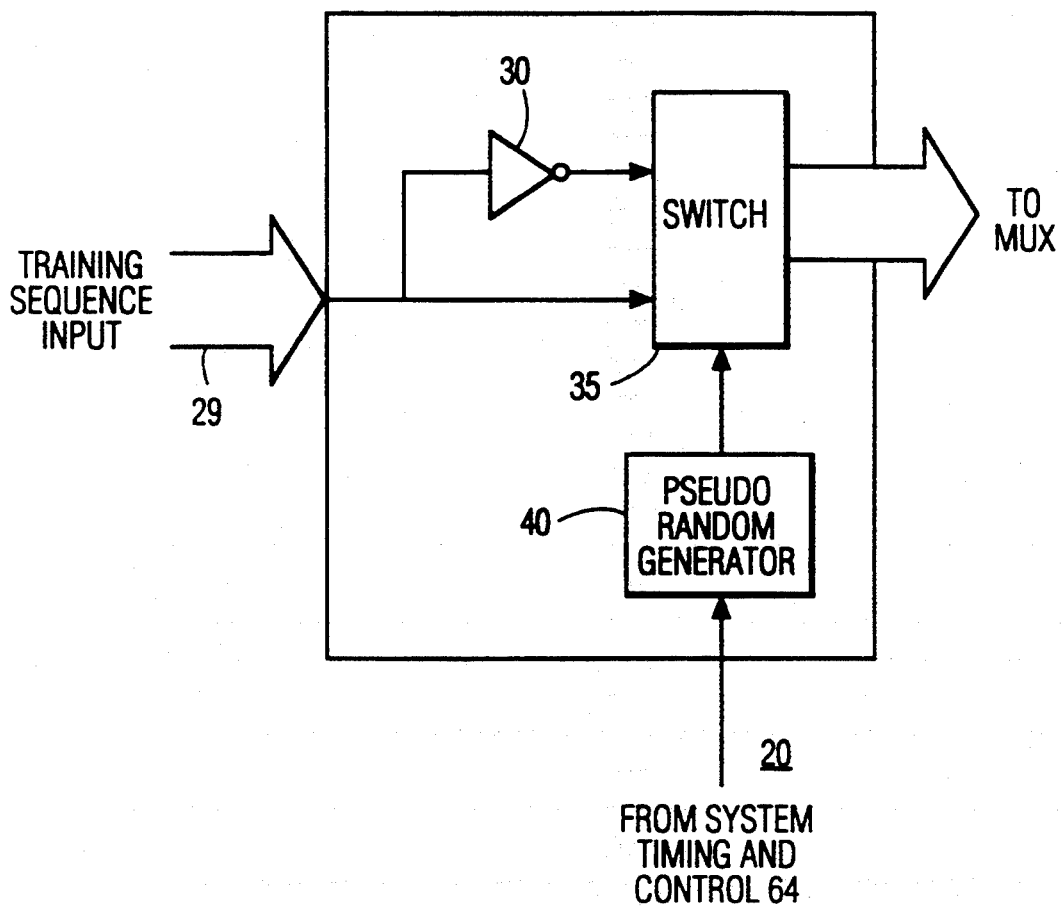
FIG. 5 is a block diagram of the training signal inverter.

FIG. 5 is a block diagram of training sequence inverter 20. The training sequence from training sequence buffer 25 is provided at training sequence input 29 and provided to one input of switch 35. The training sequence is also provided to inverter 30 which in turn provides an inverted training sequence to a second input of switch 35. The switch 35 can select as the output to I & Q symbol rate multiplexer 56, either the training signal from input 29 or its inverted version provided by inverter 30. The selection of the switch output is under the control of a pseudorandom generator 40, which will output, for example, either a "1" or a "0" on a psuedorandom basis, which will control the selection of switch output where a "1" will cause the switch to couple the first input (training sequence) to the switch output, and a "0" will cause the switch to couple the second input (inverted training sequence) to the switch output.

The activation of psuedorandom generator 20 is under the control of system timing and control circuit 64 which provides the necessary timing to provide for the necessary switching to occur between training sequences (e.g. during data packets). The system and timing control circuit 64, discussed in more detail in the parent application, can be easily designed by one skilled in the art of digital logic design.

The foregoing disclosure and description of the invention is illustrative and explanatory thereof and various changes in the details of the embodiments shown may be made within the scope of the appended claims without departing from the spirit of the invention.

We claim:

1. A method for forming a time multiplexed digital television signal comprising data portions and training signal portions, said method comprising the steps of:
    a) forming a plurality of data portions from a source of information;
    b) forming a plurality of digital training signal portions from a source of training signals, whereby selected ones of said training signals are chosen and inverted so as to form said digital training signal portions; and
    c) time multiplexing said data portions and said digital training signal portions so as to form said time multiplexed digital signal.

2. The method of claim 1, wherein said data and digital training signal portions are quadrature amplitude modulated.

3. The method of claim 1, wherein said information is a video signal.

4. The method of claim 1, wherein said data portions comprise a video signal and an audio signal.

5. An apparatus for forming a time multiplexed digital television signal comprising data portions and digital training signal portions, said apparatus comprising:
    a) means for forming a plurality of data portions from a source of information;
    b) means for forming a plurality of digital training signal portions from a source of training signals, whereby selected ones of said training signals are chosen and inverted so as to form said training signal portions; and
    c) means for time multiplexing said data portions and said digital training signal portions so as to form said time multiplexed digital signal.

* * * * *